(12) United States Patent
VanLaningham et al.

(10) Patent No.: US 8,160,569 B1
(45) Date of Patent: Apr. 17, 2012

(54) BOOTSTRAP RECURSIVE DIRECTIONAL DETERMINATION FOR DYNAMIC HIGH-RATE DIRECTIONAL NETWORKING LINKS

(75) Inventors: Steven VanLaningham, Richardson, TX (US); James A. Stevens, Lucas, TX (US); Jeffrey A. Barton, Richardson, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1283 days.

(21) Appl. No.: 11/295,896

(22) Filed: Dec. 7, 2005

(51) Int. Cl.
*H04W 4/00* (2009.01)
*H04W 24/00* (2009.01)

(52) U.S. Cl. ..................... 455/422.1; 455/424

(58) Field of Classification Search ............... 455/422.1, 455/434, 445, 452.2, 456.1, 500, 63.1, 63.4, 455/424; 370/335–338, 331, 328–330, 341–348
See application file for complete search history.

(56) References Cited

U.S. PATENT DOCUMENTS

| | | | |
|---|---|---|---|
| 6,243,052 B1 * | 6/2001 | Goldstein et al. | 343/895 |
| 6,397,083 B2 * | 5/2002 | Martin et al. | 455/562.1 |
| 6,487,186 B1 * | 11/2002 | Young et al. | 370/336 |
| 6,504,829 B1 * | 1/2003 | Young et al. | 370/337 |
| 6,574,206 B2 * | 6/2003 | Young | 370/337 |
| 6,600,754 B1 * | 7/2003 | Young et al. | 370/459 |
| 6,628,636 B1 * | 9/2003 | Young | 370/337 |
| 6,640,087 B2 * | 10/2003 | Reed et al. | 455/11.1 |
| 6,711,177 B1 * | 3/2004 | Young | 370/468 |
| 6,714,789 B1 * | 3/2004 | Oh et al. | 455/456.1 |
| 7,016,319 B2 * | 3/2006 | Baum et al. | 370/329 |
| 7,177,369 B2 * | 2/2007 | Crilly, Jr. | 375/296 |
| 7,382,799 B1 * | 6/2008 | Young et al. | 370/458 |
| 7,385,999 B1 * | 6/2008 | Young et al. | 370/432 |
| 7,397,810 B1 * | 7/2008 | Young et al. | 370/431 |
| 7,406,295 B1 * | 7/2008 | Yarkosky | 455/9 |
| 7,580,382 B1 * | 8/2009 | Amis et al. | 370/310 |
| 7,672,382 B2 * | 3/2010 | Yoshida et al. | 375/260 |
| 2003/0067906 A1 * | 4/2003 | Young | 370/347 |
| 2004/0196834 A1 * | 10/2004 | Ofek et al. | 370/352 |
| 2005/0122918 A1 | 6/2005 | Johnston | 370/310 |
| 2006/0274691 A1 * | 12/2006 | Naguib et al. | 370/330 |

* cited by examiner

*Primary Examiner* — Brandon Miller
(74) *Attorney, Agent, or Firm* — Donna P. Suchy; Daniel M. Barbieri

(57) ABSTRACT

The present invention is a wireless communication system and method. In an exemplary embodiment, the system includes a plurality of transceiver nodes arranged in a network and configured to communicate between transceiver nodes using an Orthogonal Domain Multiple Access (ODMA) frame structure, each of the plurality of transceiver nodes having neighboring nodes. Each ODMA structure may include a plurality of bootstrap slots for each of the plurality of transceiver nodes. Further, a plurality of correlation sequences may be defined within each of the plurality of bootstrap slots in which each correlation sequence included within the plurality of correlation sequences is located in a separate antenna sector and sub-sector. Addition of the plurality of correlation sequences to each of the plurality of bootstrap slots allows for recursive directional determination of which antenna sector and sub-sector is to be used to communicate with one of the plurality of transceiver nodes.

10 Claims, 17 Drawing Sheets

BOOTSTRAP RECURSIVE DIRECTIONAL DETERMINATION FOR DYNAMIC HIGH-RATE DIRECTIONAL NETWORKING LINKS

FIELD OF THE INVENTION

The present invention relates generally to the field of wireless communication networks and more particularly to a method and a system for recursive determination of link direction and antenna usage in Mobile Ad Hoc Networks.

BACKGROUND OF THE INVENTION

Mobile ad-hoc networks have become increasingly prevalent in situations where a supporting infrastructure is absent. A mobile ad-hoc network (MANET) is a self-configured network of wireless and mobile nodes communicating via radio links. Such network does not rely upon a centralized administration to operate or include any pre-defined infrastructure. Such network is attractive in highly mobile situations such as in combat operations for a MANET is easy to deploy and again, does not require a supporting infrastructure.

In order to support a better network throughput as well as reduce interference and jammer susceptibility, MANETs require directional linkage. Providing reliable, adaptive, and flexible directional links for mobile platforms is associated with a variety of challenges. For instance, a conventional MANET may employ bootstrap slots to allow nodes to communicate their presence to other nodes within the network. In addition, such bootstraps may also be used to communicate neighboring nodes positions such that neighbors that are two or even three hops away from any given node are known by each node. FIG. 1 outlines a bootstrap and the placement of the bootstrap within an Orthogonal Domain Multiple Access (ODMA) frame. In such arrangement, only a few bootstraps are sent in each frame so that the remainder of the frame may be used for user traffic (as opposed to control traffic). The limitation of this configuration is that it may take several frames for all nodes in the network to get an opportunity to transmit their bootstraps. Anything that increases the duration of the bootstrap slot adds to control traffic and therefore, either reduces the user traffic per frame or the number of bootstrap data per frame which, in turn, reduces the dynamic responsiveness of the network to changes. An additional challenge facing wireless directional MANETs is the need to be compatible with Open System Interconnection (OSI) layered architectures and the ability to operate within existing and future antenna and antenna array technologies.

Therefore, it would be desirable to provide a system and method for efficient discovery of link directionality and maintenance of accurate beam angles or antenna selections between many mobile platforms.

SUMMARY OF THE INVENTION

In accordance with a first aspect of the present invention, a wireless communication system is provided. In such aspect, the system includes a plurality of transceiver nodes arranged in a network and configured to communicate between transceiver nodes using an Orthogonal Domain Multiple Access (ODMA) frame structure, each of the plurality of transceiver nodes having neighboring nodes. Each ODMA structure may include a plurality of bootstrap slots for each of the plurality of transceiver nodes. Further, a plurality of correlation sequences may be defined within each of the plurality of bootstrap slots in which each correlation sequence included within the plurality of correlation sequences is located in a separate antenna sector and sub-sector. For examples, the correlation sequence is a MiniNiB. A MiniNiB may be a preamble/preheader/correlation sequence which directly precedes a NiB. A NiB (Neighbor i Bootstrap) may be defined as the actual data portion of a management slot. Addition of the plurality of correlation sequences to each of the plurality of bootstrap slots allows for recursive directional determination of which antenna sector and sub-sector is to be used to communicate with one of the plurality of transceiver nodes.

In accordance with specific aspects of the wireless communication system, the wireless communication system may operate in Layer 1 and Layer 2 of an Open System Interconnection (OSI) layered architecture. For instance, the wireless communication system may include a signal-in-space adapter for providing an interface between signals-in-space and Layer 2 of the OSI layered architecture. In addition, the plurality of antenna sectors may include a multi-element antenna cluster. For example, the multi-element antenna cluster may include a plurality of slanted sectors and a single sector parallel with a surface to which the multi-element antenna cluster is mounted. An omni-directional antenna may be mounted through the center of the single parallel sector. Moreover, the plurality of antenna sub-sectors may include at least one of individual antenna elements or a beam position with a steerable phased array. It is contemplated that the present wireless communication system may be incorporated into a number of systems including a joint tactical radio system (JTRS), a future combat system (FCS), a vehicle mounted radio, a soldier-borne radio, an airborne platform radio, a common data link, or a mobile ad-hoc directional network. In a further aspect, a global positioning system or inertial navigation system is included within the wireless communication system for assisting with angle tracking. For instance, the global positioning system or inertial navigation system may include a tracking filter for estimating node position and velocity.

In accordance with an additional aspect of the present invention, a method for recursive determination of link direction and antenna usage in a wireless network is provided. The method may include receiving a first bootstrap correlation sequence that is transmitted by a transmitting node to a receiving node in order to identify an antenna sector to be used to communicate with the transmitting node. The method may also include receiving of a second bootstrap correlation sequence by the receiving node to refine the directionality of the identified antenna sector. The refinement may continue until an individual antenna element or phased array beam angle is determined.

In accordance with a further aspect of the present invention, an additional method for direction determination in a wireless network is provided. The method may include processing sequentially a plurality of correlation sequences defined within a bootstrap slot. Each correlation sequence included within the plurality of correlation sequences is located in a separate antenna sector. The signal-to-noise ratio may be recorded for each antenna sector in order to identify the antenna sector with the largest signal-to-noise ratio. The receiving nodes may then switch to the antenna sector with the largest signal-to-noise ratio and continue processing the rest of the data within the bootstrap slot from such sector.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Referring now to FIGS. 2 through 14 in general, a wireless communication system is provided. In an exemplary embodiment, the wireless communication system includes a sectored antenna system including a plurality of antenna sectors and antenna sub-sectors for allowing directional networking. An antenna switching matrix may be communicatively coupled to the sectored antenna system to provide a total combined output for each sector included within the plurality of antenna sectors and each sub-sector included within the plurality of antenna sub-sectors. In addition, a first MiniNiB boot strap may be communicatively coupled to the sectored antenna system for selecting an antenna sector included within the plurality of antenna sectors to be used to communicate with a transmitting node. Moreover, a second MiniNiB boot strap may be communicatively coupled to the sectored antenna system for refining a directionality of the antenna sector selected by the first MiniNiB boot strap. The addition of a plurality of MiniNiBs to the first MiniNiB boot strap and the second MiniNiB boot strap allows for recursive directional determination of which antenna sector is to be used to communicate with a transmitting node.

Figure 2:
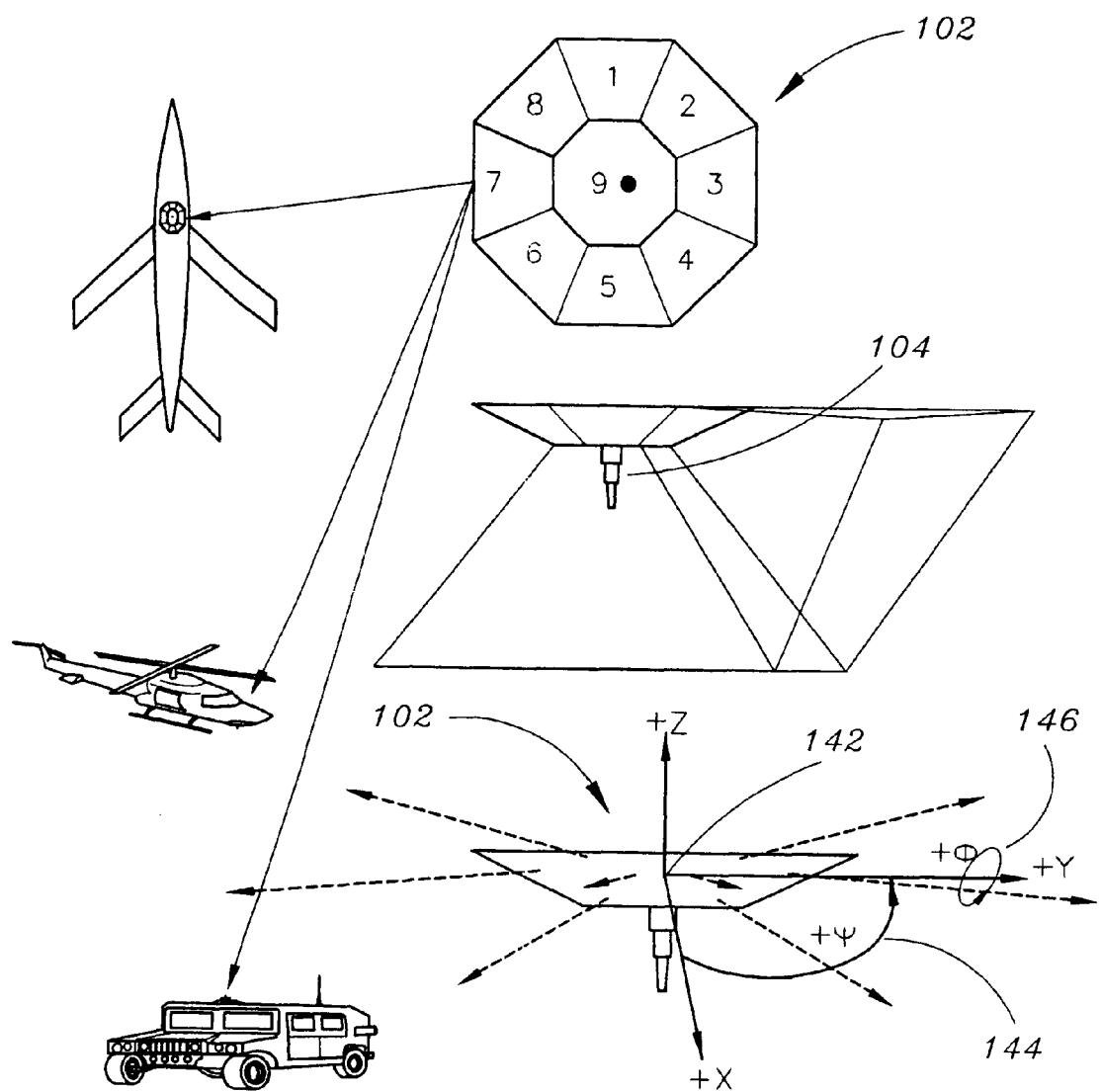
FIG. 2 is a schematic diagram of a segmented directional antenna cluster in accordance with an exemplary embodiment of the present invention.

Referring to FIG. 2, an exemplary antenna sector included within the wireless communication system is provided. In an embodiment, the antenna sector may include a multi-element (e.g., sectored) directional antenna cluster 102. As illustrated in FIG. 2, the multi-element antenna cluster 102 may include eight slanted sectors and one sector (denoted as 9) which is parallel with the surface to which the cluster is to be mounted. The parallel sector 9 allows for coverage immediately above or below a platform depending upon the mounting orientation. The present cluster allowing for approximately three-hundred and sixty degrees (360°) of coverage. Further, an omni-directional antenna 104 may be mounted through the center of the single parallel sector 9 for allowing radio signals to be radiated and received. For example, the omni-directional antenna 104 is a wideband omni-directional antenna. It is contemplated that the directional antenna sectors may utilize any number of sub-sector antenna elements including individual antenna elements 106 or a beam position with a steerable phased array 108. See FIG. 3. It is further contemplated that the directional antenna sectors may be capable of communicating with multiple entities simultaneously. As illustrated in FIG. 2, an aircraft, a helicopter, and a land mobile vehicle all may be in communications simultaneously with the antenna sector 7.

Figure 3:
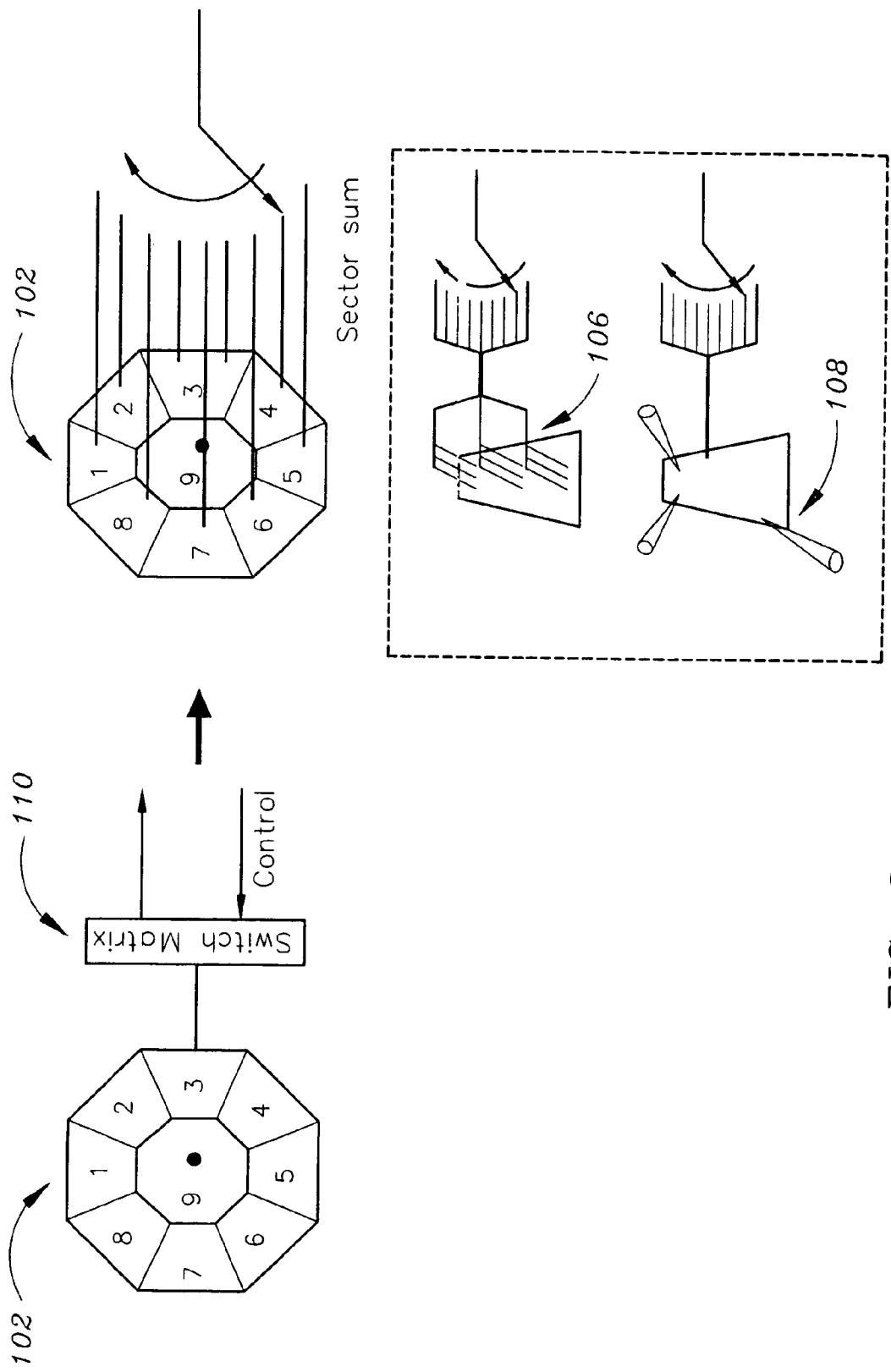
FIG. 3 is a schematic diagram of an exemplary switch matrix for a bootstrap recursive determination guide in accordance with an exemplary embodiment of the present invention.

Referring to FIG. 3, an exemplary antenna switching matrix 110 for facilitating recursive directional discovery within the wireless communication system is provided. In an exemplary embodiment, the antenna switching matrix 110 may be communicatively coupled to the sectored antenna system to provide a total combined output for each sector included within the plurality of antenna sectors and each sub-sector included within the plurality of antenna sub-sectors. As illustrated in FIG. 3, the antenna switching matrix 110 is communicatively coupled to the multi-element (e.g., sectored) directional antenna cluster 102 and is capable of providing the total combined (and unphased for phased arrays) output for each individual sector in addition to each sub-element or phased steering angle. It is contemplated that the switching time for the antenna switching matrix 110 may be approximately less than one-hundred microseconds (100 μsec) or within the range of current pin diode switch technology. For phase steerable beam arrays 108, the beam controller may be commandable to a specific azimuth and elevation within the required time period.

Figure 1:
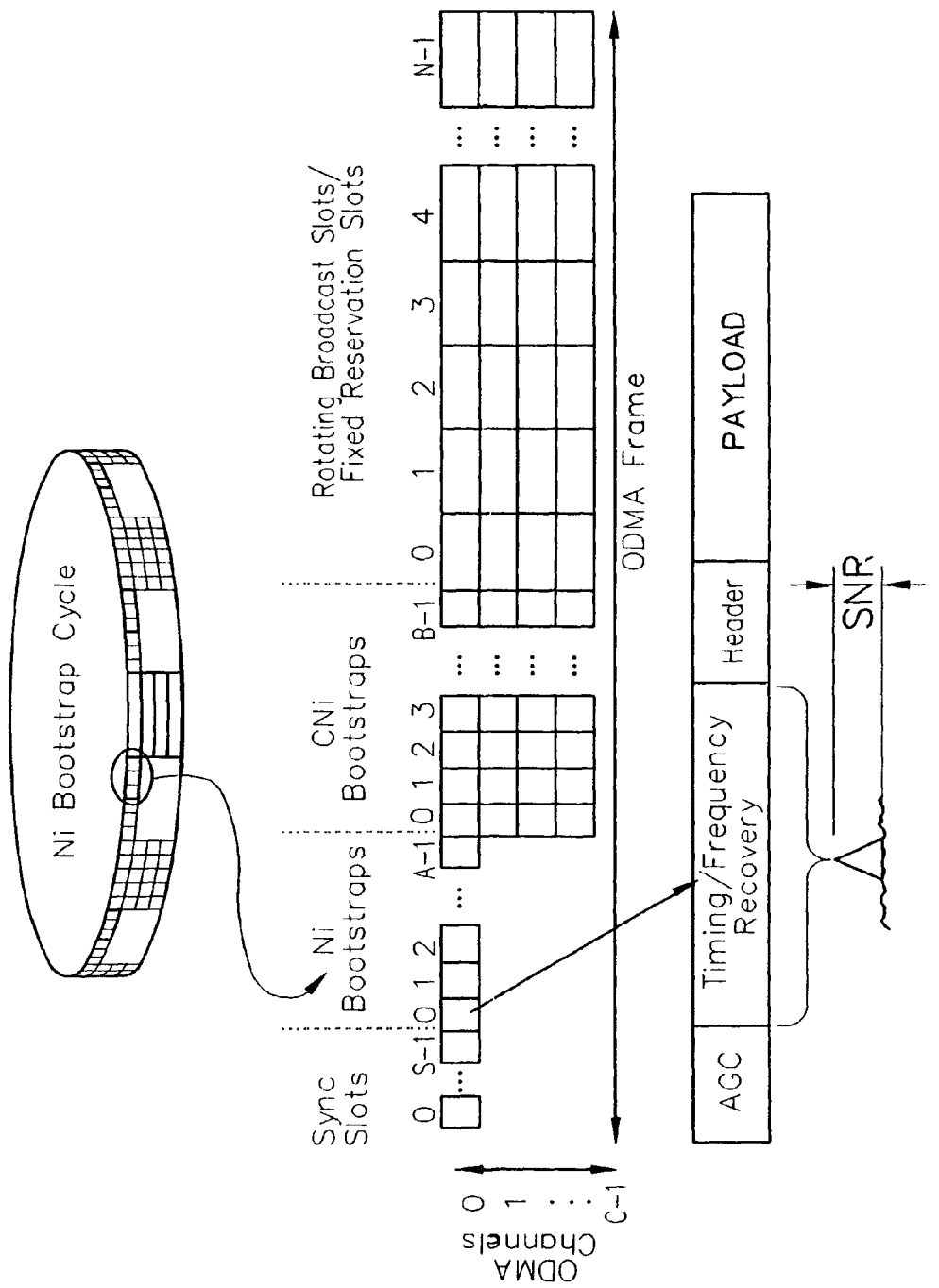
FIG. 1 is schematic diagram of a bootstrap slot.
Figure 4:
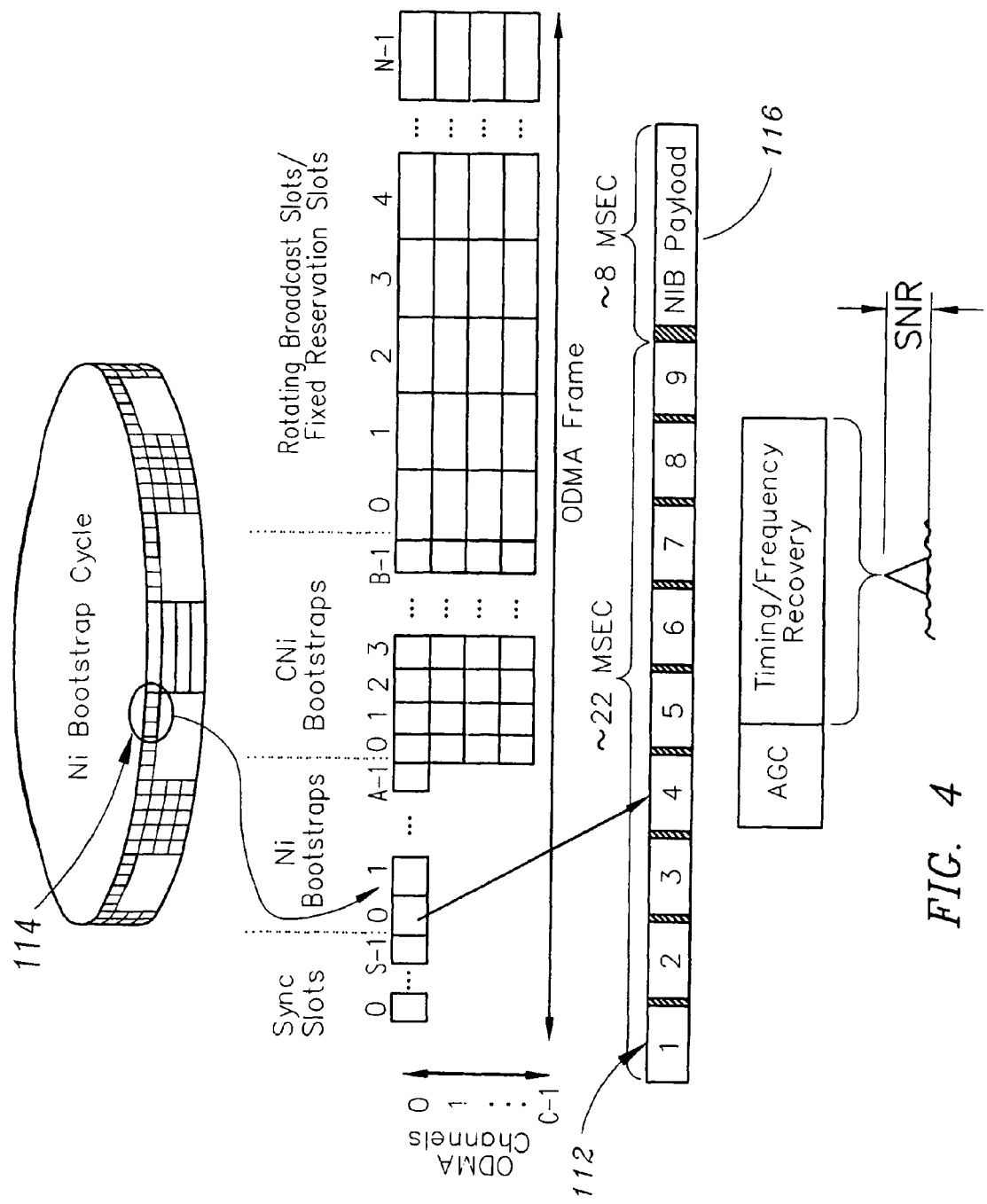
FIG. 4 is a schematic diagram of an addition of small correlation sequences to a bootstrap slot in accordance with an exemplary embodiment of the present invention.
Figure 5:
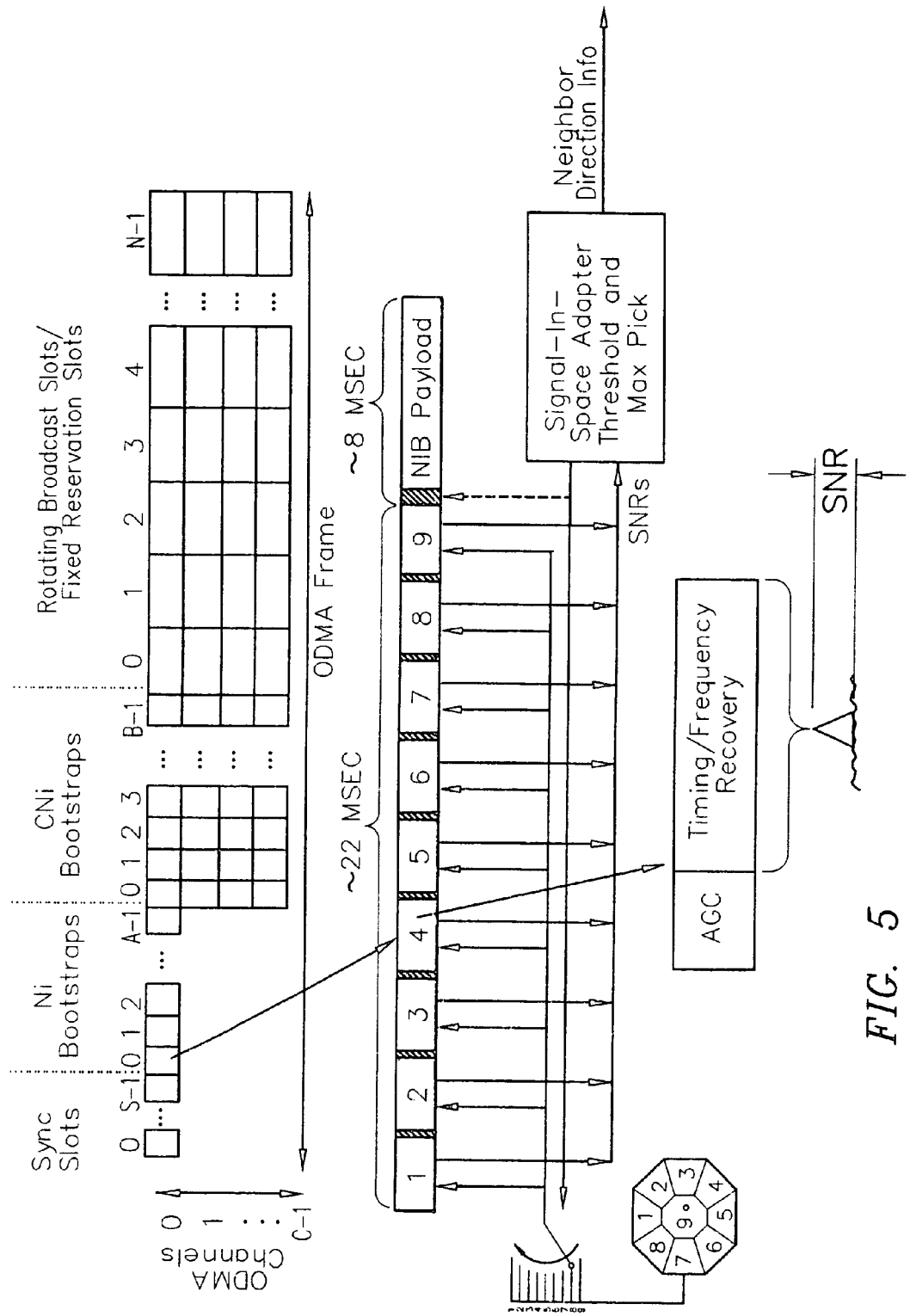
FIG. 5 is a schematic diagram of an addition of small correlation sequences to a bootstrap slot in accordance with an exemplary embodiment of the present invention, wherein a first bootstrap is used to determine a directional sector.
Figure 6:
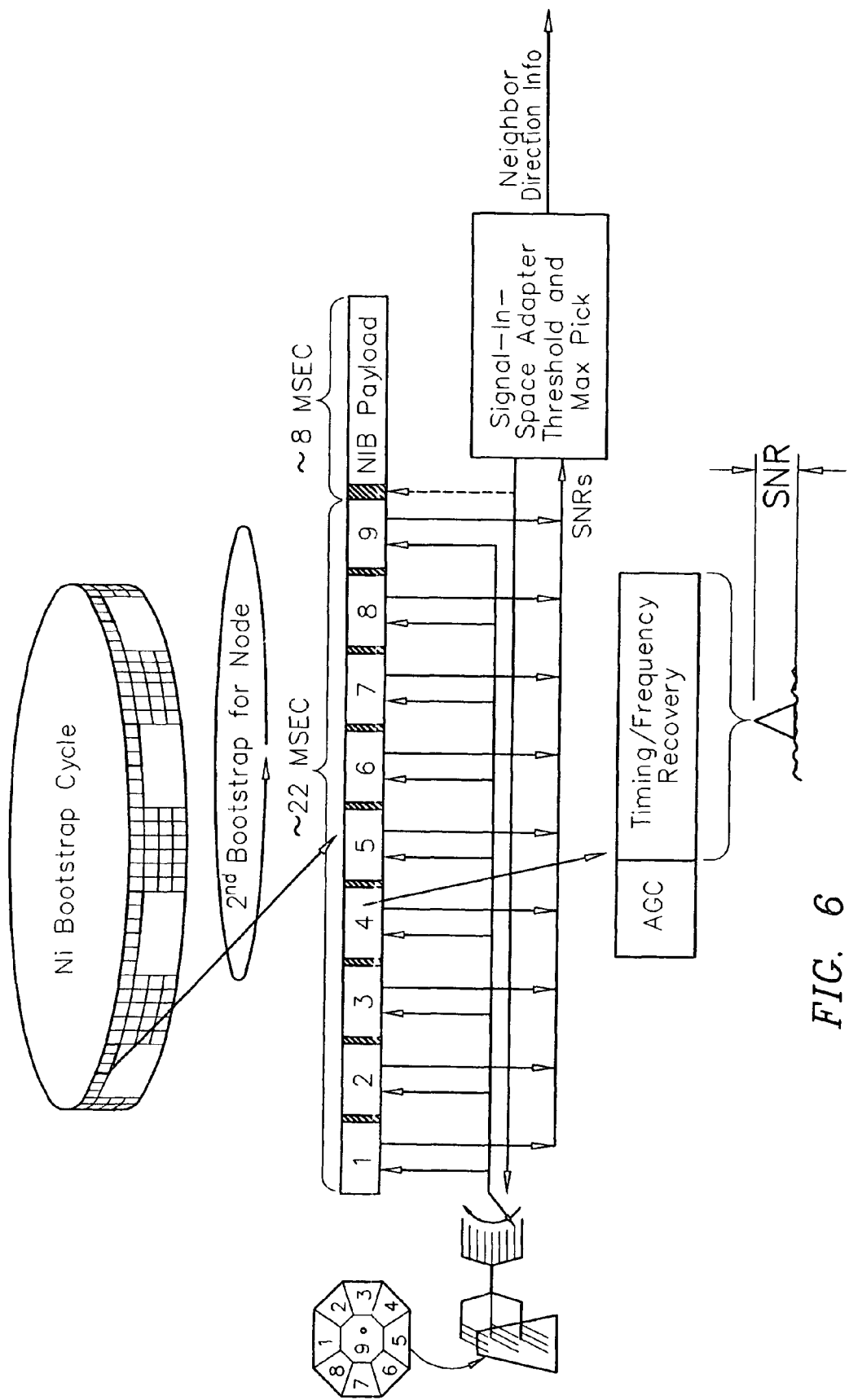
FIG. 6 is a schematic diagram of an addition of small correlation sequences to a bootstrap slot in accordance with an exemplary embodiment of the present invention, wherein a second bootstrap is used to determine a sub-sector element.

Referring to FIGS. 4 through 6, exemplary boot straps in accordance with the present invention are provided. The present wireless communication system utilizes multiple copies of a preamble/preheader/correlation sequence referred to as a MiniNiB for direction discovery. This is in contrast to the bootstrap illustrated in FIG. 1 wherein MiniNiB's are not included. A MiniNiB is defined as the correlation sequence directly preceding a NiB. A NiB (Neighbor i Bootstrap) may be defined as the actual data portion of a management slot. The correlation sequence may provide a signal-to-noise-ratio (SNR) which in some systems such as Joint Tactical Radio System (JTRS) is required to be reported to a designated link (e.g., for JTRS, a Mobile Data Link) for functionality.

In an embodiment, a MiniNiB (the shortest possible sequence that may be extracted from a typical NiB) is replicated by the number of directional sectors used in an antenna cluster. FIG. 4 shows the structure of a MiniNiB and the placement of MiniNiB within an ODMA frame structure in accordance with an exemplary embodiment of the present invention. As illustrated in FIG. 4, nine MiniNiBs (denoted generally as 112) have been added to a boot strap slot 114 in front of a NiB payload 116 to allow for direction discovery.

An exemplary wireless communication system may include a first MiniNiB boot strap (see FIG. 5) and a second MiniNiB bootstrap (see FIG. 6). The first MiniNiB bootstrap may be communicatively coupled to the sectored antenna system for selecting an antenna sector included within the plurality of antenna sectors to be used to communicate with a transmitting node. Moreover, the second MiniNiB boot strap may be communicatively coupled to the sectored antenna system for refining a directionality of the antenna sector selected by the first MiniNiB boot strap. The addition of a plurality of MiniNiBs to the first MiniNiB boot strap and the second MiniNiB boot strap allows for recursive directional determination of which antenna sector is to be used to communicate with a transmitting node.

In an exemplary embodiment, a transmitting node (whose turn it is to transmit in the NiB slot) transmits the MiniNiB train followed by a single copy of the NiB payload. In such embodiment, the node initially joins the network using its omni-directional antenna only. Once network time has been established (with or without assistance from a global positioning system or inertial navigation system) the node listens in all bootstrap slots other than its own and listens for the first copy of the MiniNiB in sector 1, the second MiniNib in sector 2 and so on until all the sectors have been listened on. The SNR of each sector is recorded and upon processing of the last sector's SNR a brief period as needed by the SiS computing resource, on the order of 100 μsec for computation plus 100 μsec to switch the receiving antenna to the resulting beam direction, is inserted between the last MiniNiB and the NiB payload for the receiving nodes to compute which sector had the largest SNR and then, switch to that sector for listening and processing the rest of the NiB.

Figure 7:
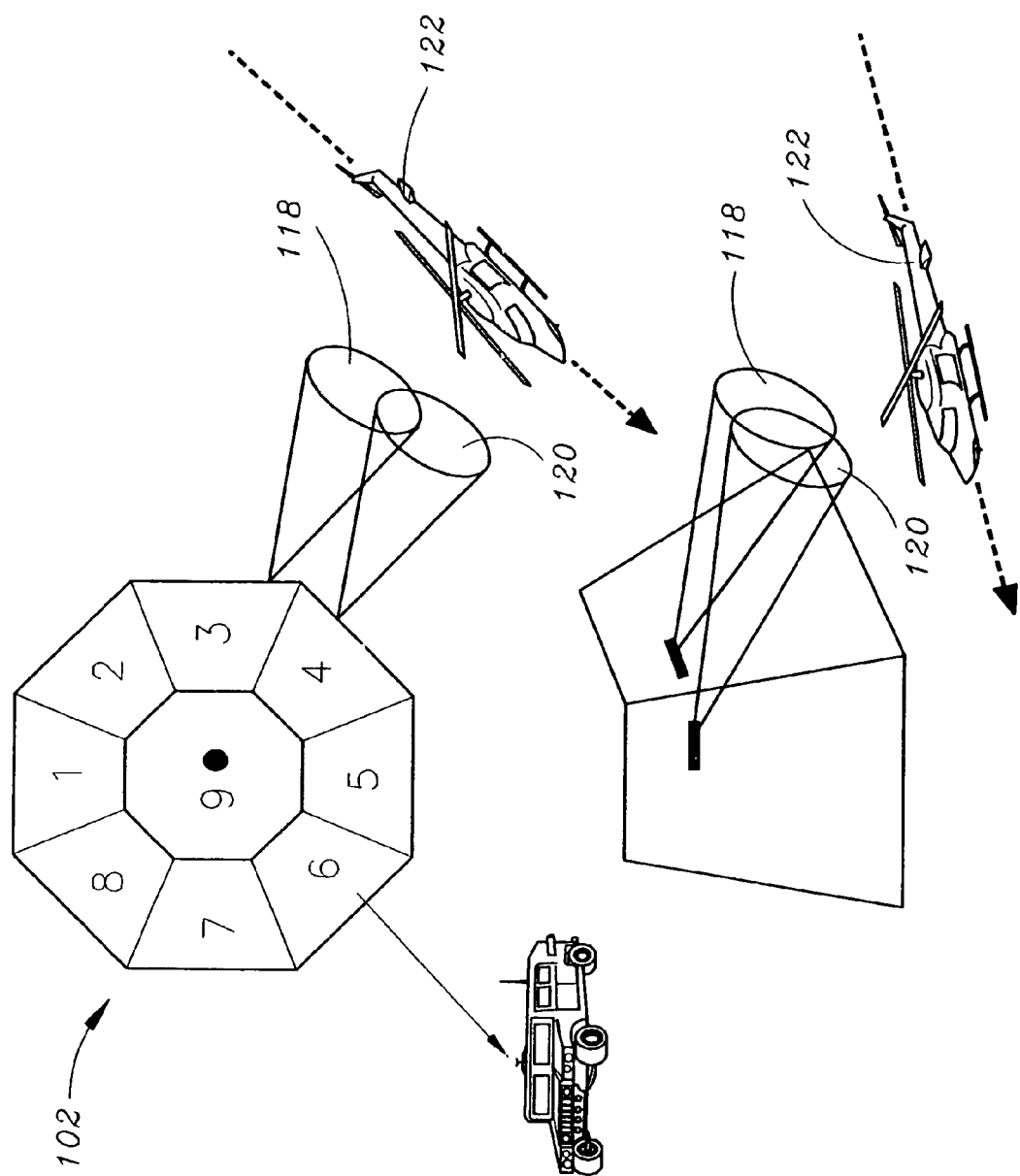
FIG. 7 is a schematic diagram illustrating accommodation of migration across directional sectors by using an adjacent antenna element in accordance with an exemplary embodiment of the present invention.

Referring to FIG. 7, the capability of the wireless communication system to respond to changes in platform dynamics by using an adjacent antenna element is illustrated. In an exemplary embodiment, the wireless communication system is capable of maintaining directional communications without interruption even in the presence of changes in platform dynamics by employing an antenna system which includes overlap on the antenna sector edges. In such embodiment, as the platform migrates from the area covered by one antenna sector to another sector, both the sector as well s the sub-sector element is changed simultaneously so as to not loose communication on a directional link. Here, when the sector discovery MiniNiB bootstrap determines that sector change is need the adjacent antenna element to the one currently being used is also specified at that time to be changed.

As illustrated in FIG. 7, the antenna sector cluster 102 includes antenna sector 3 including antenna 118 and antenna sector 4 including antenna 120. As the aircraft 122 changes position, the antenna sector and sub-element are also changed. Here, antenna sector 3 including antenna 118 are changed to antenna sector 4 including antenna 120. The change to antenna sector 4 and antenna 120 are made simultaneously. Subsequent MiniNiB bootstraps may be employed to confirm or modify the change. However, since the next MiniNiB slot may be a second or more in the future, such change will continue to provide continued directional communications provided that the inter-sector overlap is sufficient.

Figure 8:
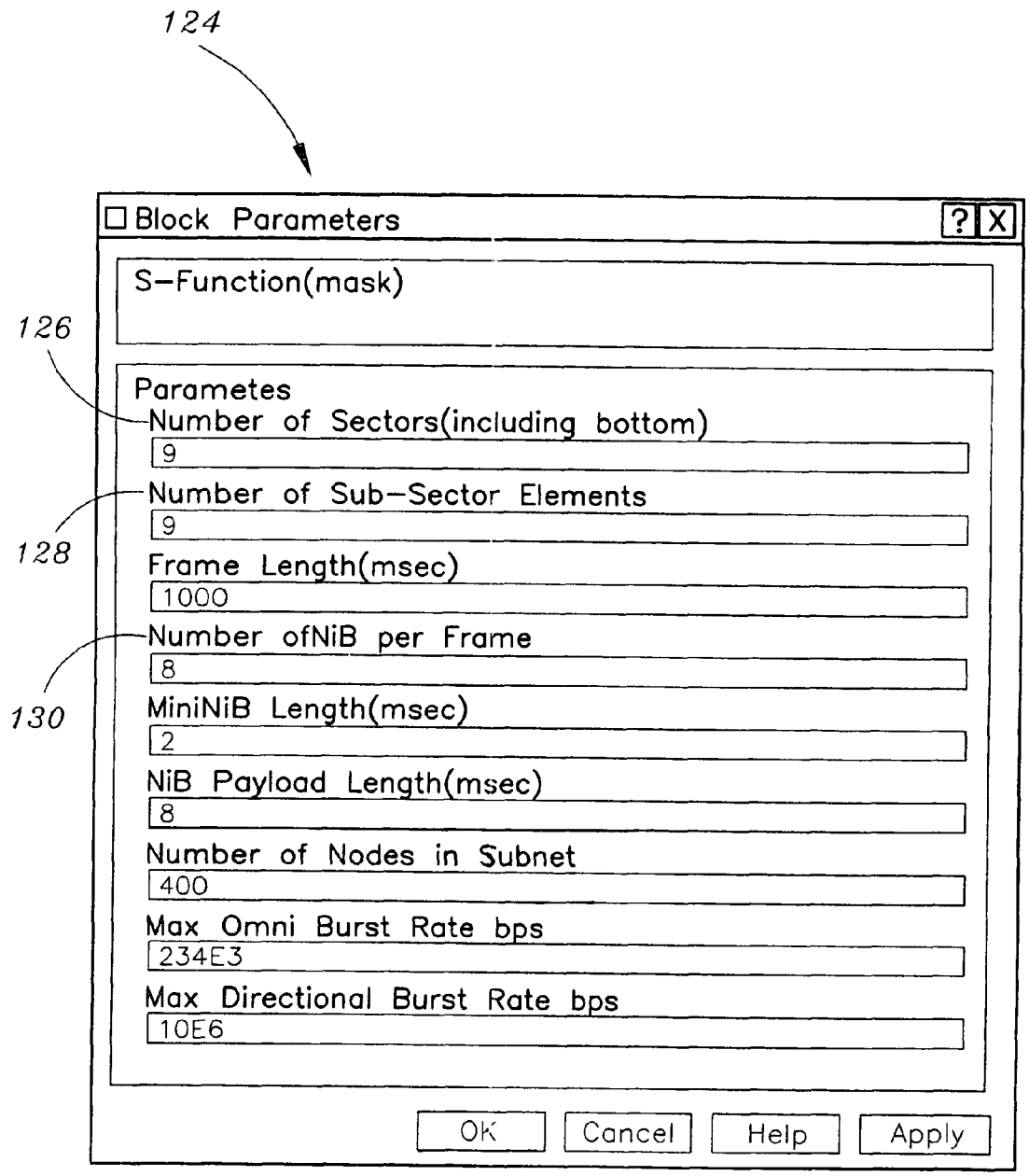
FIG. 8 is an exemplary frame structure setup for a wireless network system in accordance with an exemplary embodiment of the present invention, wherein block parameters for the wireless network system are provided.
Figure 9:
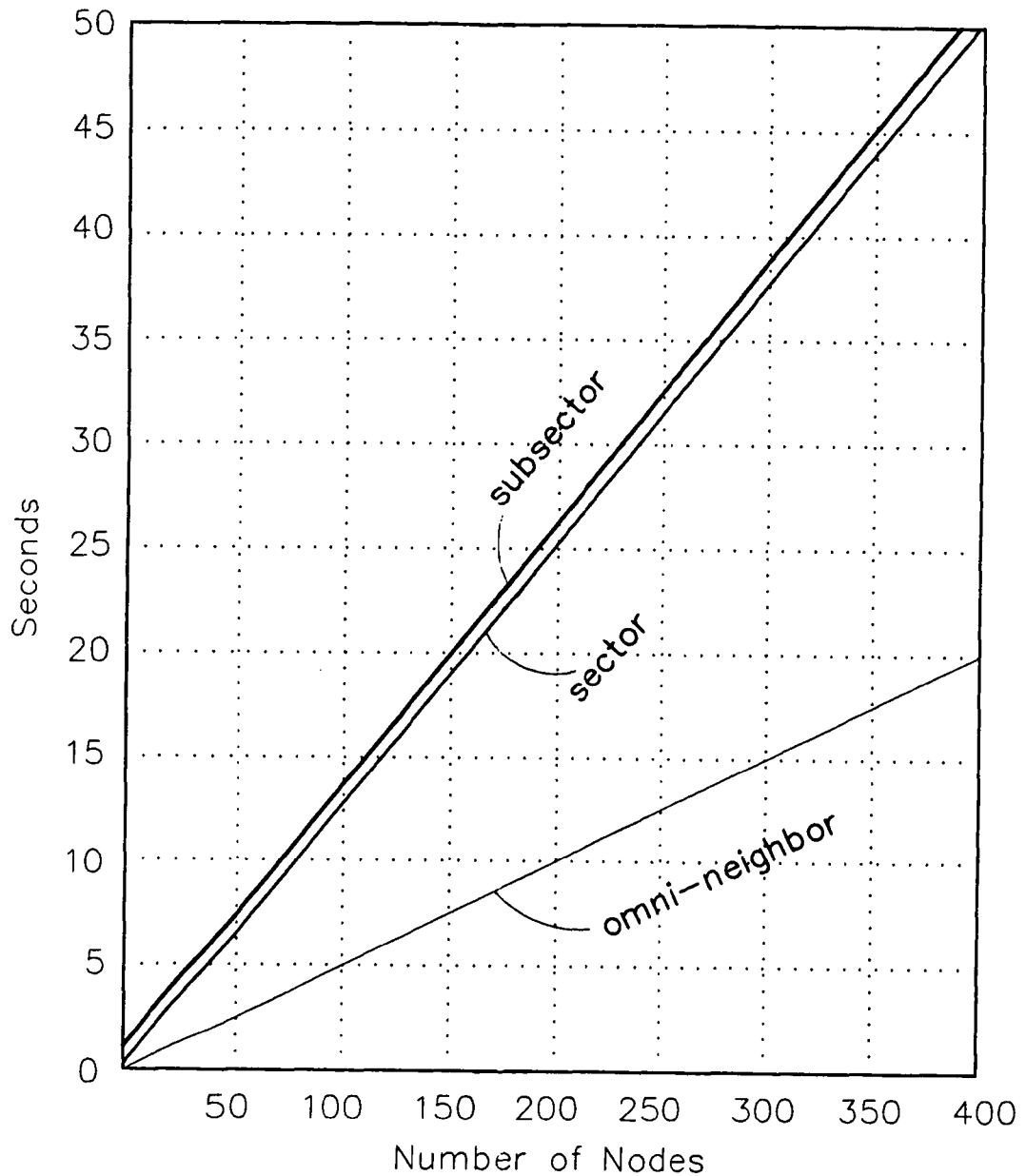
FIG. 9 is a graphic diagram for performance comparison of a typical framing structure with and without directionality in accordance with an exemplary embodiment of the present invention.

Referring to FIGS. 8 and 9, the performance of an exemplary wireless communication system using omni-directional antennas only and not employing MiniNiBs in the bootstrap slots is illustrated. FIG. 8 provides an exemplary frame structure setup 124 illustrating various block parameters that the wireless communication system may include. An exemplary frame structure is defined with the number of desired antenna sectors 126 and sub-sector elements 128 determining the number of MiniNiBs 130 to be used. The more MiniNiBs that are employed the longer the bootstrap slots become and hence the longer the discovery and update cycle for a given percentage of frame time dedicated to user traffic.

FIG. 9 demonstrates that a system using omni-directional antennas only and not employing MiniNiBs in the bootstrap slots discovers neighboring nodes more quickly due to the reduced NiB slot time. Such phenomena is a result of the increased traffic throughput with directional antennas. As the number of nodes in the network increases, the time difference also increases. The time delay in discovery with MiniNiBs may also translate into longer periods between position updates and thus, for more dynamic platforms a GPS/INS or other heading aiding to predict and track nodes in between updates may be employed.

Figure 10:
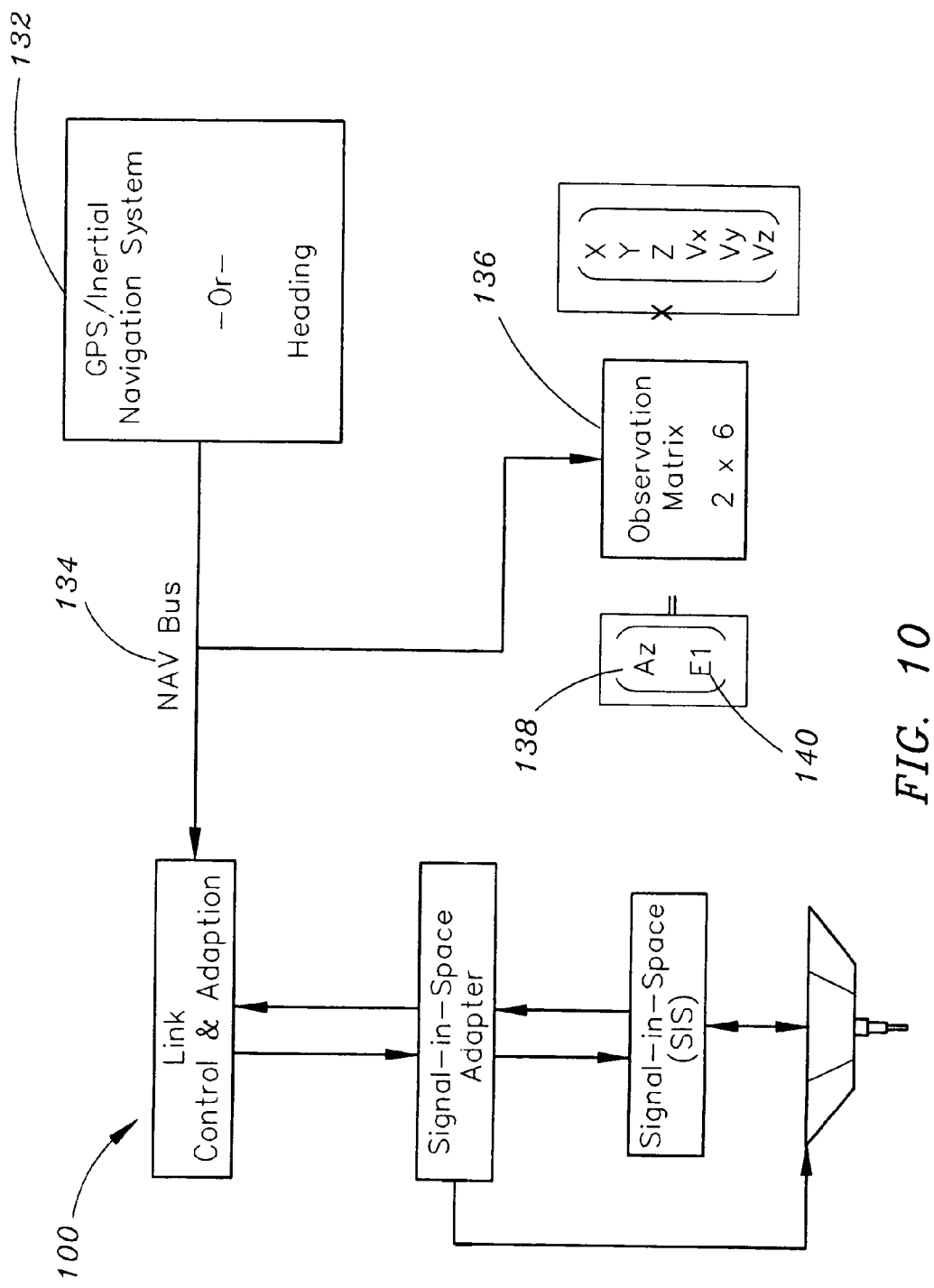
FIG. 10 is a schematic diagram illustrating a wireless network system in accordance with an exemplary embodiment of the present invention, wherein a global positioning system/inertial navigation system has be incorporated into the system to aid tracking.

Referring to FIG. 10, insertion of a GPS/INS or heading aiding for beam tracking on dynamic platforms is demonstrated. As illustrated in FIG. 10, a GPS/INS system 132 may be linked to the wireless communication system 100 via a navigational bus 134. In an exemplary embodiment, the GPS/INS system may include a tracking filter for estimating node position and velocity. For example, the actual neighboring node's position and velocity may be estimated via a Kalman filter. In such example, the position and velocity of the measuring node are entered into an observation matrix 136 that transforms the neighbor node states into the measured azimuth 138 and elevation angles 140.

An exemplary coordinate system for use with subsequent tracking algorithms (detailed below) to allow for such directional tracking is provided in FIG. 2. In an exemplary embodiment, the origin of the coordinate system is approximately at the X, Y, Z center 142 of the active antenna sector 102. In the present embodiment, an α β tracking filter is employed to provide smoothing as well as prediction capability between MiniNiB observations.

The following tracking algorithms are utilized with the coordinate system for smoothing azimuth 144 and elevation 146.

Smoothed Azimuth (Az):

$$Az(t)=Az(t-1)+\alpha(Az_{meas}-Az(t-1)) \quad \text{(Equation 1)}$$

Smoothed Az angular velocity (VAz):

$$VAz(t)=VAz(t-1)+\beta/Ts(Az_{meas}-Az(t-1)) \quad \text{(Equation 2)}$$

Smoothed Elevation (El):

$$El(t)=El(t-1)+\alpha(El_{meas}-El(t-1)) \quad \text{(Equation 3)}$$

Smoothed El angular velocity (VEl):

$$VEl(t)=VEl(t-1)+\beta/Ts(El_{meas}-El(t-1)) \quad \text{(Equation 4)}$$

The following tracking algorithms are utilized with the coordinate system for predicting azimuth 144 and elevation 146 in between MiniNiB measurements.

$$PAz(t)=PAz(t-1)+VAz(mt)*Ts \quad \text{(Equation 5)}$$

Where:
PAz (t)=current prediction of azimuth
PAz (t−1)=the last prediction of azimuth (or the last value from Equation 1))
VAz (mt)=the angular velocity estimate of azimuth from the last update (Equation 2)
Ts=time since the last prediction or update was made [(t)−(t−1)]

$$PEl(t)=PEl(t-1)+VAz(mt)*Ts \quad \text{(Equation 6)}$$

Where:
PEl (t)=current prediction of elevation
PEl (t−1)=the last prediction of elevation (or the last value from Equation 1))
VEl (mt)=the angular velocity estimate of elevation from the last update (Equation 4)
Ts=time since the last prediction or update was made [(t)−(t−1)]

Figure 11:
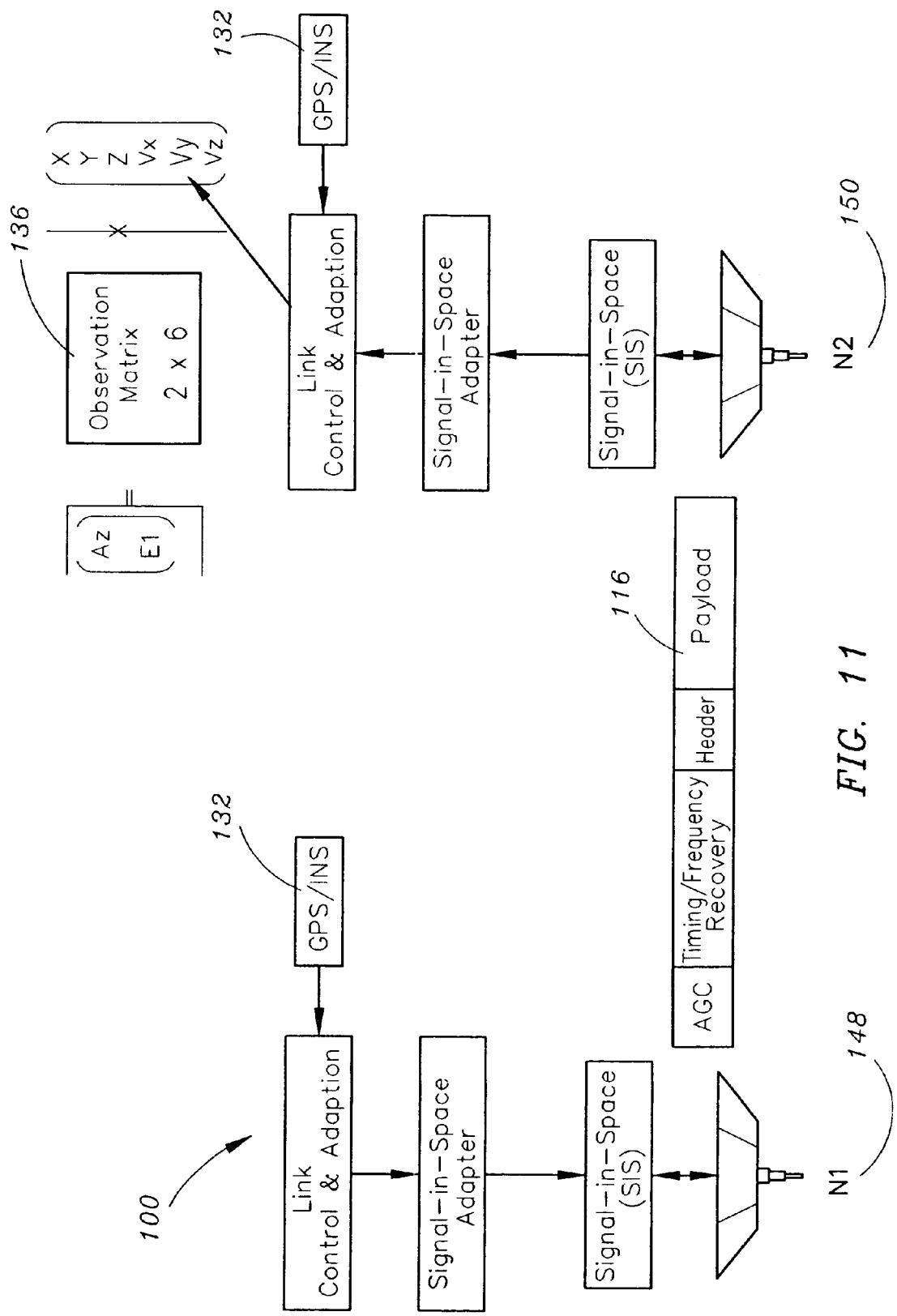
FIG. 11 is a schematic diagram illustrating an additional wireless network system in accordance with an exemplary embodiment of the present invention, wherein a global positioning system/inertial navigation system is used to extract positional and velocity information embedded in a bootstrap payload at Node 1 and used to initially seed a tracking filter at Node 2 upon reception of the initial "discovery" bootstrap.

Referring to FIG. 11, the use of GPS/INS extracted position and velocity information embedded in the NiB payload at Node 1 being extracted and used to initially seed a tracking filter at Node 2 upon reception of the initial "discovery" bootstrap is provided. In an embodiment, coordinate values for Node 1 148 are inserted into the NiB payload 116. Node 2 150 receives such information and may be used by Node 2 to increase the accuracy of the states at Node 2 150. However, the primary function of the tracking filter at Node 2 150 is to provide tracking information and prediction between receptions (e.g., updates) of the bootstrap NiBs.

Figure 12:
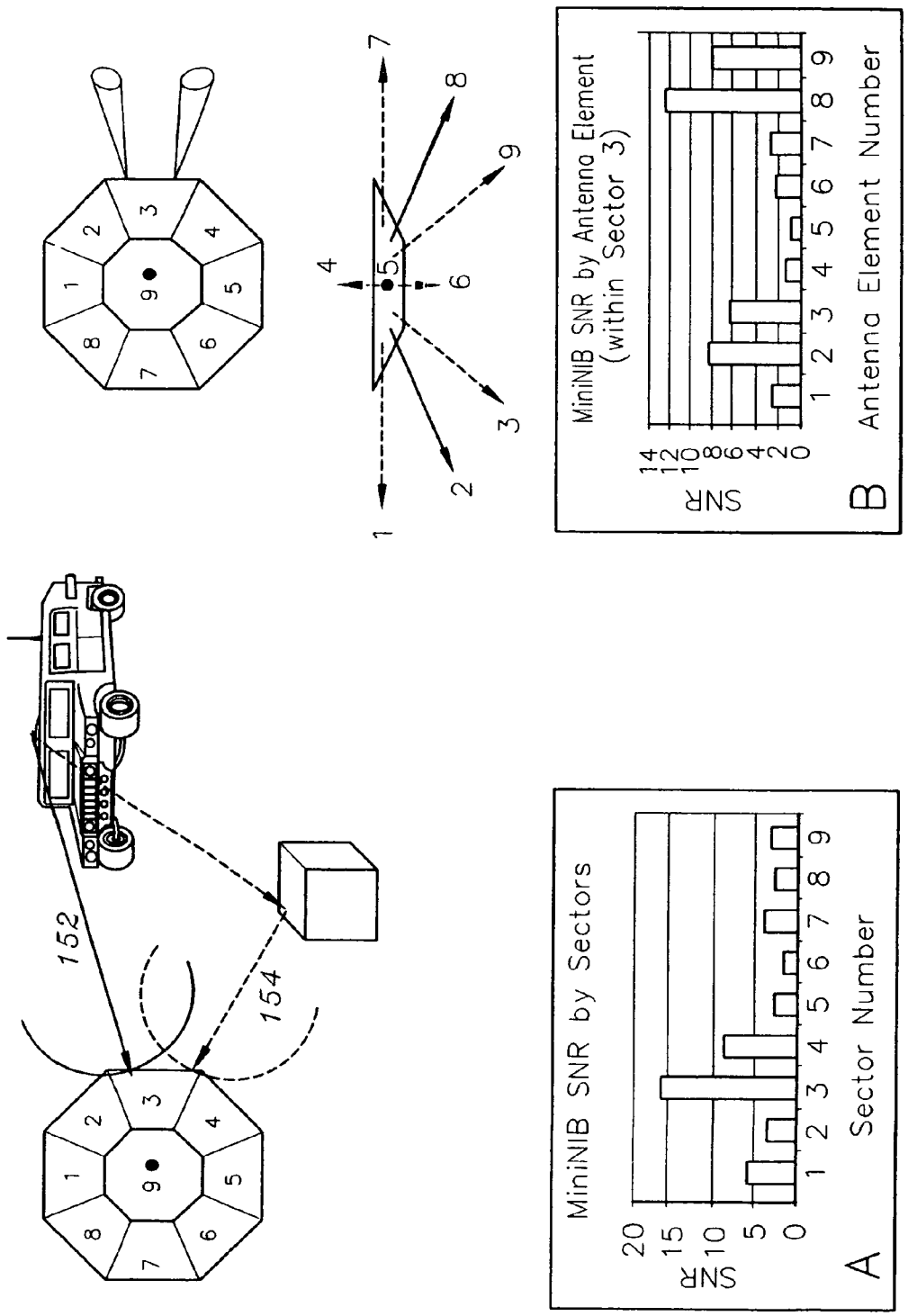
FIG. 12 is a schematic diagram illustrating multiple beam selection for multi-path tracking with rake equipped signal-in-space.

Referring to FIG. 12, multiple beam selection for multipath tracking with a Rake equipped SiS is provided. When a spread spectrum signal-in-space (SiS) is used it may be desirable to select more than one antenna element or beam angle from the switch matrix. For instance, the switch matrix is capable of providing the sum of more than one antenna element (e.g., beam angle) up to and included all elements within a sector in which the sum of all elements within a sector is what is used during the MiniNiB sector correlation cycle. In an embodiment, a SiS utilizes Rake receivers to track the time-delayed multi-path reflections and antenna elements (e.g., beam angles) also track the multi-path reflections. The Rake receiver may be a technique which uses several baseband correlators to individually process multi-path signal components. The outputs from the different correlators are combined to achieve improved reliability and performance. Although the exemplary embodiment employs Rake receivers, it is contemplated that additional techniques may be employed to track multi-path reflections.

An example of the sector and sub-sector correlation selections from the corresponding MiniNiB cycles and the multiple antenna element selection within the chosen sector is provided in FIG. 12. As illustrated in FIG. 12, a direct signal path 152 travels from a mobile entity to an antenna sector. In addition, a reflected path 154 is also generated by use of a reflector 156. In the present example, sector 3 is chosen from MiniNiB sector correlation (panel A) and antenna elements 2 and 8 are chosen from MiniNiB subsector correlation (panel B).

Figure 13:
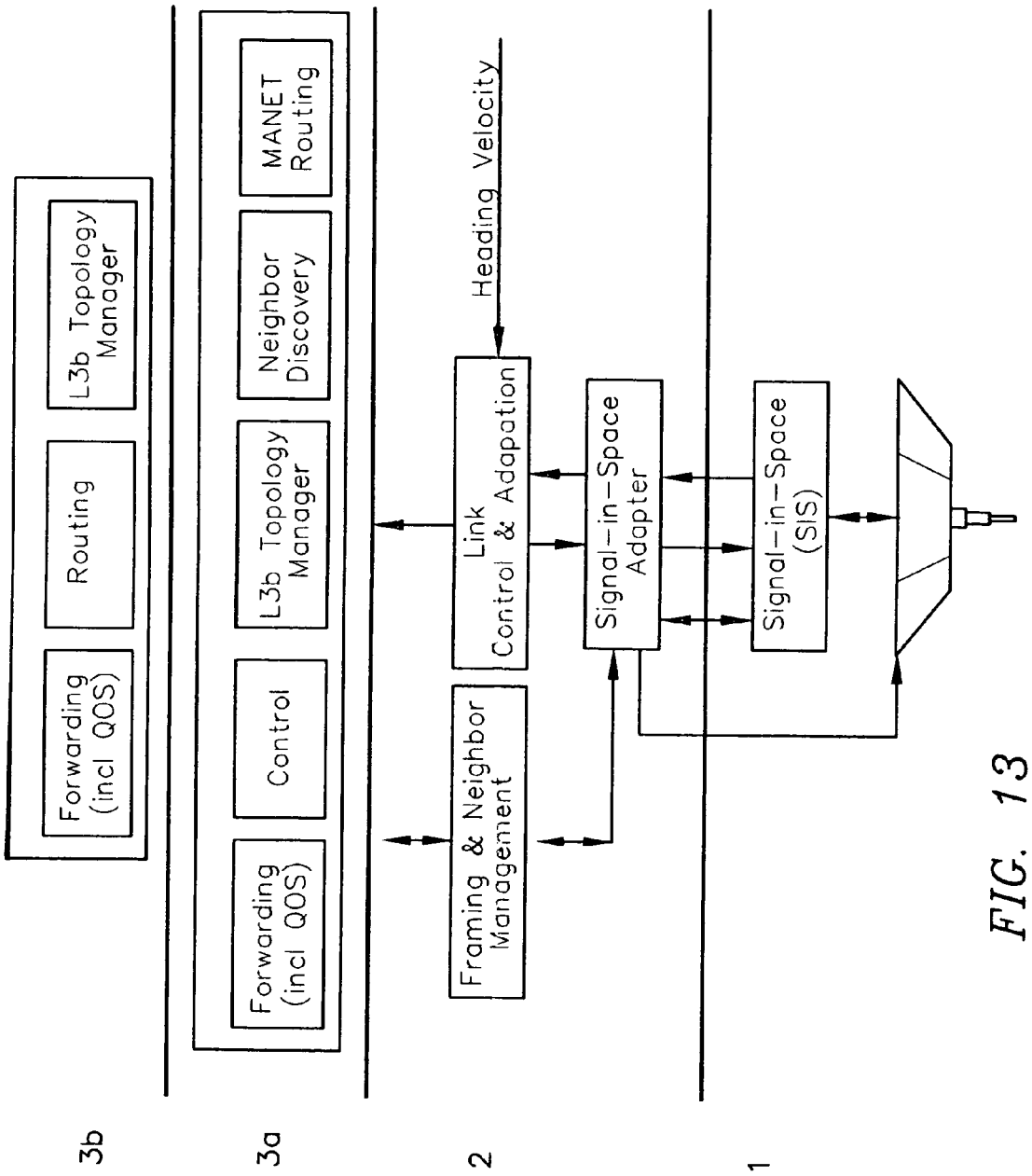
FIG. 13 is a schematic diagram of a wireless network system in accordance with an exemplary embodiment of the present invention, wherein the system is incorporated into OSI layer 1 and layer 2.

Referring to FIG. 13, the capability of the present wireless system to be compatible with Open System Interconnection (OSI) layered architecture is illustrated. As illustrated in FIG. 13, the OSI layered architecture includes multiple layers including layers 1, 2, 3a, and 3b. Each layer being designated to perform distinct functions. The functionality of the present wireless communication system resides in OSI layer 1 and layer 2. Such configuration allows the normal routing and control functionality of the higher layers to be isolated and the present system to be added to existing layer 3+software without requiring modifications. Link metrics that may be used by algorithms at the higher layers for quality of service (QoS), topology management, routing performance, and the like may observe the impact of directionality in terms of bandwidth increase, interference reduction, reliability increase (measure of drop-out), stability increase (measure of change in power and bandwidth), jitter reduction, and other like effects. In addition, the high layers may be enabled to correctly route and manage a mixture of directional and non-directional links without modification.

Figure 14:
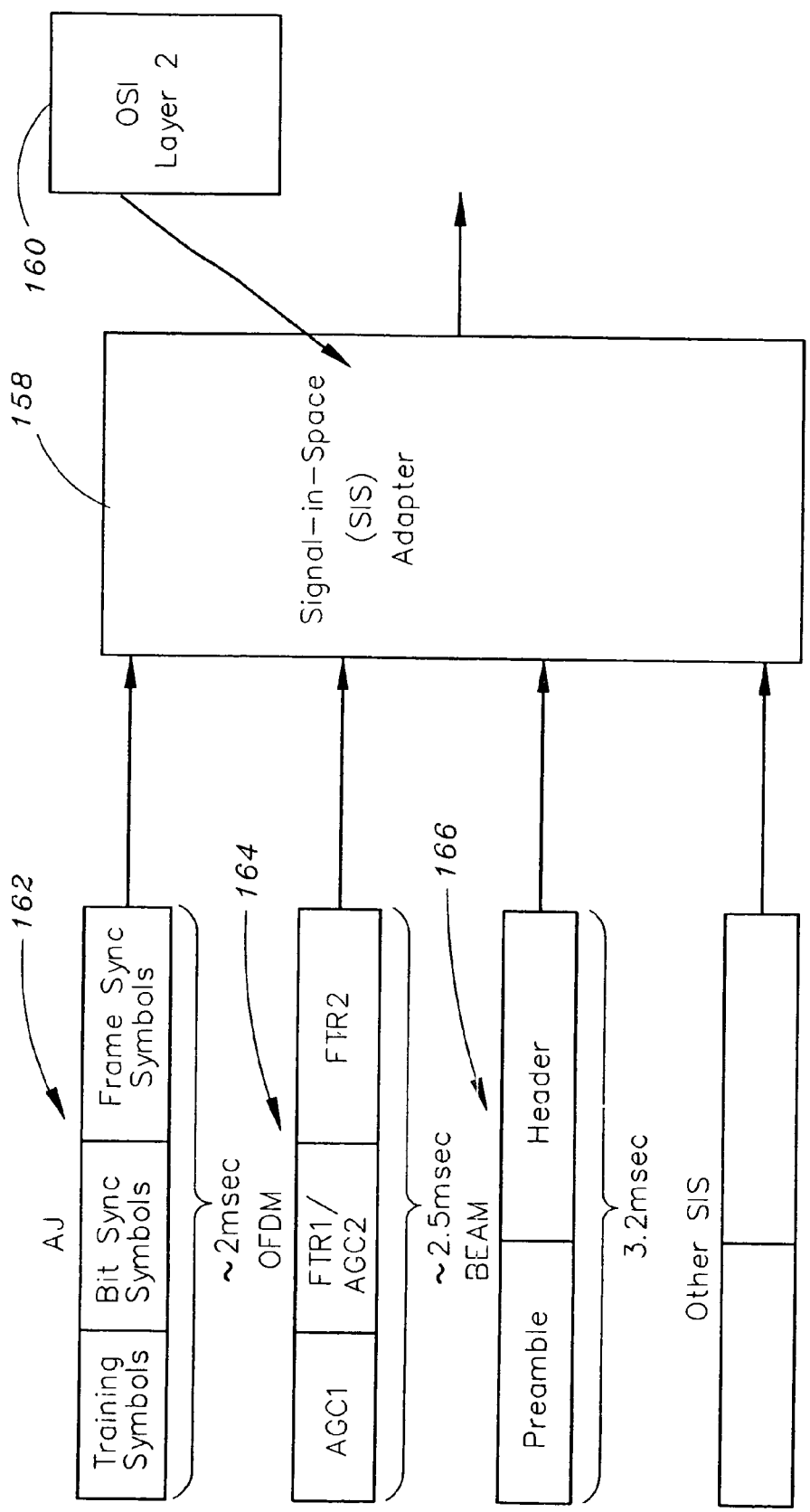
FIG. 14 is a schematic diagram illustrating a wireless network system including a signal-in-space adapter in accordance with an exemplary embodiment of the present invention, wherein the signal-in-space adapter provides a common interface between OSI layer 2 and different types of signals-in-space.

Referring to FIG. 14, the presence of a signal-in-space (SiS) adapter 158 in the wireless communication system for providing a common interface between OSI layer 2 160 and the SiS is illustrated. The majority of SiS currently used in JTRS utilize some form of timing recovery that involves the use of a correlation sequence. In addition to providing timing recovery, this correlation sequence also provides a SNR value. All JTRS waveforms (e.g., Anti-Jam (AJ) 162, Bandwidth Efficient Advance Modulation (BEAM) 164, and Orthogonal Frequency Division Multiplexing (OFDM) 166) are required to report SNR to OSI layer 2 160 for link adaptation processing. FIG. 12 includes representative SiSs. As illustrated in FIG. 12, various correlation sequences are contained in different SiS. For example, an Anti-Jam SiS 162 correlation sequence includes training symbols, bit sync symbols, and frame sync symbols. In an embodiment, the SiS adapter 158 receives SNR values from the different types of SiS. The SiS adapter may translate or scale the received SNR values to a common metric that may be used by the wireless communication system incorporated in OSI layer 2.

Figure 15:
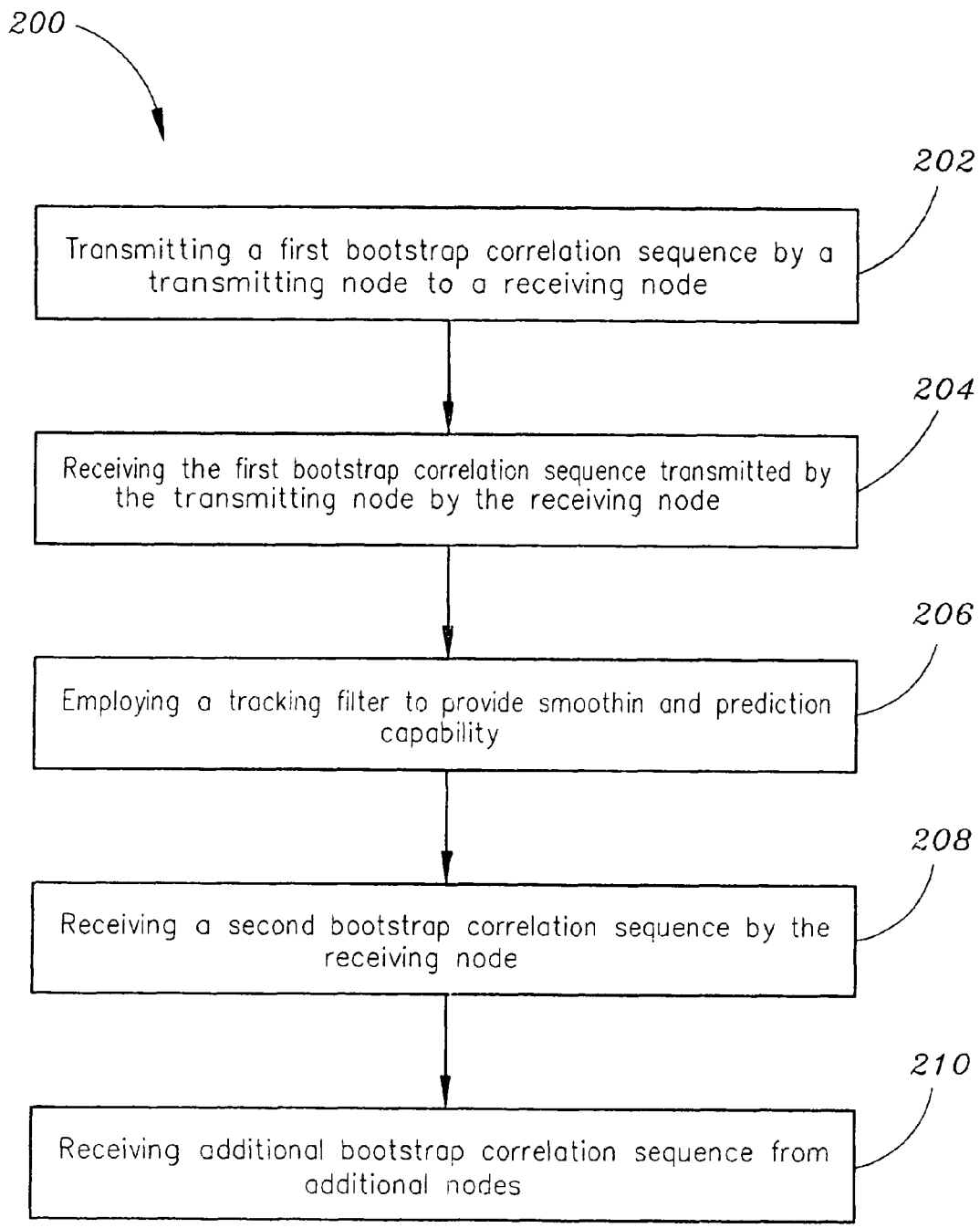
FIG. 15 is a flow diagram of a method for recursive determination of link direction and antenna usage in a wireless network in accordance with an exemplary embodiment of the present invention, wherein the method includes adding small correlation sequences to a bootstrap slot.

Referring to FIG. 15, a method 200 for recursive determination of link direction and antenna usage in a wireless network in accordance with an exemplary embodiment of the present invention is provided in which the method includes adding small correlation sequences to a bootstrap slot. In an exemplary embodiment, the method 200 may include transmitting a first bootstrap correlation sequence (e.g., a MiniNiB bootstrap) by a transmitting node to a receiving node 202. The first bootstrap correlation sequence transmitted by the transmitting node may then be received by the receiving node 204 in order to identify an antenna sector to be used to communicate with the transmitting node. In an embodiment, the antenna sector includes a multi-element directional antenna cluster. For example, the multi-element antenna cluster may include a plurality of slanted sectors and a single sector parallel with a surface to which the multi-element antenna cluster is mounted. In addition, an omni-directional antenna may be mounted through the center of the single parallel sector for allowing radio signals to be radiated and received.

The method 200 may also include receiving of a second bootstrap correlation sequence (e.g., a second MiniNiB bootstrap) by the receiving node 206 to refine the directionality of the identified antenna sector. The refinement may continue until an individual antenna element or phased array beam angle is determined. In further embodiments, the method 200 may include receiving of additional bootstrap correlation sequences from additional nodes 210 to re-determine the antenna sector to be used with the transmitting node. Moreover, the method 200 may also include employing a tracking filter to provide smoothing and prediction capability 206 between receiving the first bootstrap correlation sequence and the second bootstrap correlation sequence. It is contemplated that the method 200 may be implemented in Layer 1 and Layer 2 of an OSI layered architecture.

Figure 16:
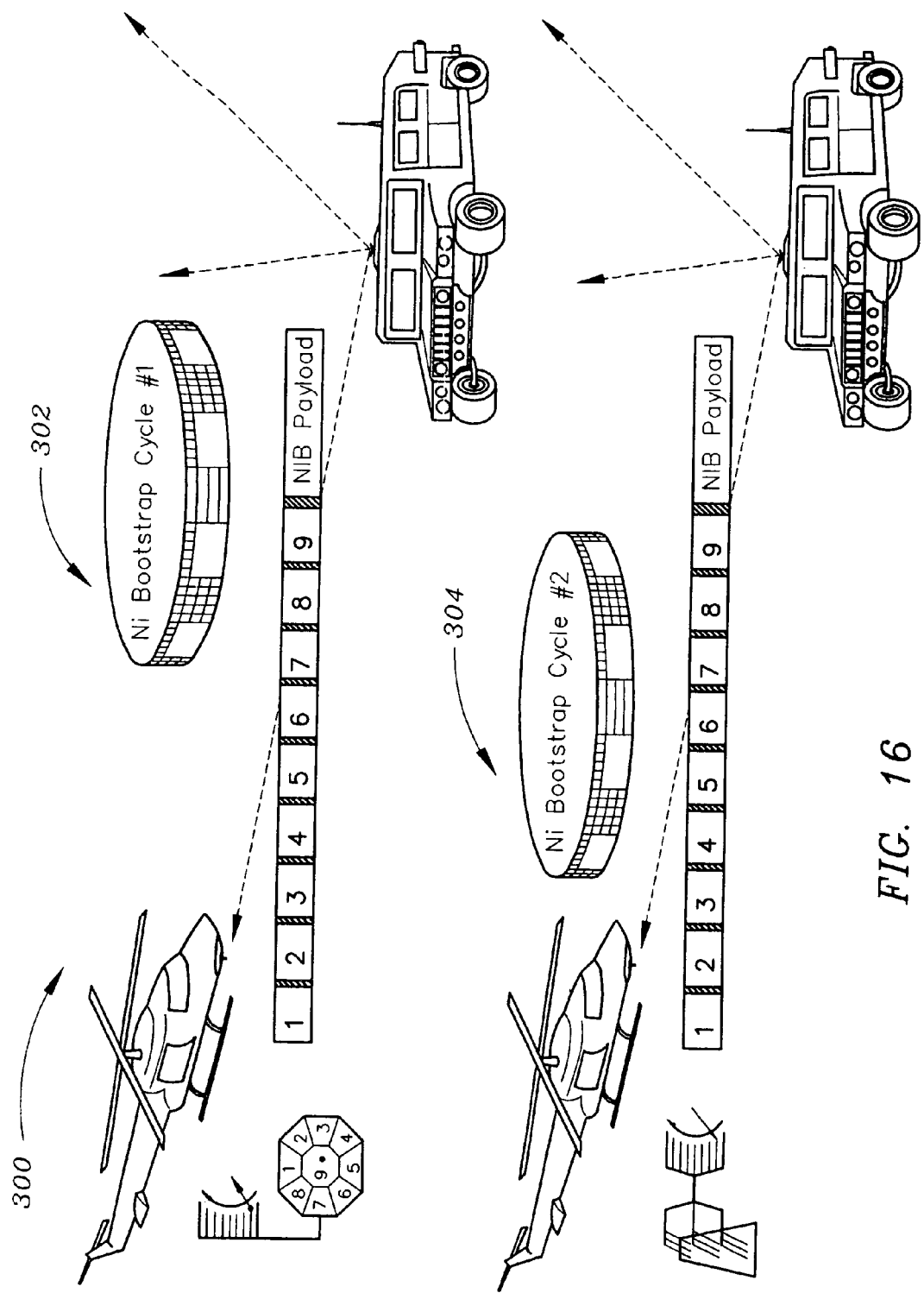
FIG. 16 is a schematic diagram illustrating a sequence of direction discovery through the use of small correlation sequences (MiniNiBs) in accordance with an exemplary embodiment of the present invention.

A sequence of direction discovery employing the method 200 described above is provided in FIG. 16. As illustrated in FIG. 16, a wireless communication system 300 includes a first MiniNiB bootstrap cycle 302 which involves the transmitting of a MiniNiB bootstrap from a transmitting node to a receiving node and receiving node(s) using such transmission to determine which antenna sector is to be used to communicate with the transmitting node. In addition, the system 300 includes a second MiniNiB bootstrap cycle 304 which used to further refine the directionality of the antenna sector and thereby determine the sub-sector element. It is contemplated that additional MinNiB bootstraps may be needed to further refine the directionality in order to obtain the smallest addressable unit of direction (i.e., individual antenna element or phased array beam angle). It is further contemplated that once the finest increment of direction to the transmitting node is determined, the receiver may repeat the process. For instance, the next MiniNiB bootstrap received from a particular node will be used to re-determine the proper antenna sector to be used.

Figure 17:
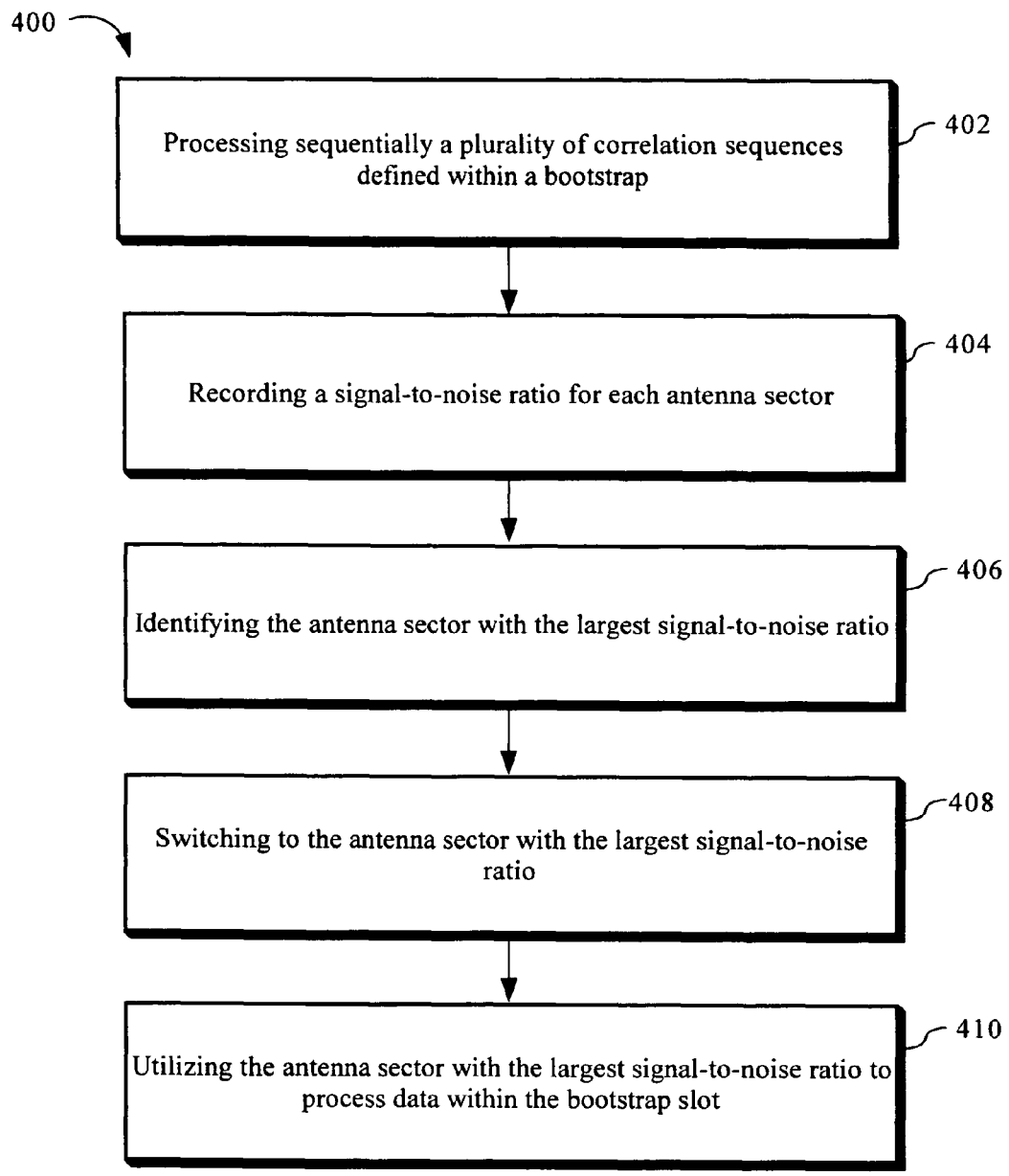
FIG. 17 is a flow diagram of an additional method for direction determination in a wireless network in accordance with an exemplary embodiment of the present invention.

Referring to FIG. 17, an additional method 400 for direction determination in a wireless network is provided. In an exemplary embodiment, the method 400 may include processing sequentially a plurality of correlation sequences defined within a bootstrap slot 402. In the present embodiment, each correlation sequence included within the plurality of correlation sequences is located in a separate antenna sector. The method 400 may also include recording the signal-to-noise ratio for each antenna sector 404 in order to identify the antenna sector with the largest signal-to-noise ratio 406. The receiving nodes may then switch to the antenna sector with the largest signal-to-noise ratio 408 and utilize such sector to process data within the bootstrap slot 410.

It is contemplated that the disclosed system and method may be implemented within a Joint Tactical Radio System (JTRS), Future Combat System (FCS) or similar software-defined radios. JTRS as well as FCS are a family of software programmable radios that provide the Armed Forces with voice, data and video communications as well as interoperability across the joint battle space. Such system may be integrated on selected maritime, airborne, fixed-station, ground mobile, man-pack, and hand-held platforms. The disclosed system and method are not, however, limited to these systems or to military radio systems in general.

It is to be noted that the foregoing described embodiments according to the present invention may be conveniently implemented using conventional general purpose digital computers programmed according to the teachings of the present specification, as may be apparent to those skilled in the computer art. Appropriate software coding may readily be prepared by skilled programmers based on the teachings of the present disclosure, as may be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for recursive determination of link direction and antenna usage in a wireless network, comprising:
    receiving a first correlation sequence transmitted by a transmitting node at a receiving node;
    identifying an antenna sector of the receiving node to be used to communicate with the transmitting node according to a signal-to-noise ratio of the first correlation sequence;
    receiving a second correlation sequence transmitted by the transmitting node at the receiving node; and
    refining the directionality of an identified antenna sector of the receiving node to an antenna sub-sector or phased array beam angle of the identified antenna sector according to a signal-noise-ratio of the second correlation sequence.

2. The method as claimed in claim 1, further comprising receiving additional correlation sequences from additional nodes to re-determine the antenna sector to be used with the transmitting node.

3. The method as claimed in claim 1, wherein the antenna sector includes a multi-element antenna cluster.

4. The method as claimed in claim 3, wherein the multi-element antenna cluster includes a plurality of slanted sectors and a single sector parallel with a surface to which the multi-element antenna cluster is mounted, an omni-directional antenna is mounted through the center of the single parallel sector.

5. The method as claimed in claim 1, wherein the method is implemented in Layer 1 and Layer 2 of an Open System Interconnection (OSI) layered architecture.

6. The method as claimed in claim 1, further comprising employing a tracking filter to provide smoothing and prediction capability between receiving the first correlation sequence and receiving the second bootstrap correlation sequence.

7. The method as claimed in claim 1, wherein the method is implemented in at least one of a joint tactical radio system (JTRS), a future combat system (FCS), a vehicle mounted radio, a soldier-borne radio, an airborne platform radio, a common data link, or a mobile ad-hoc directional network.

8. The method of claim 1, further comprising: providing a smoothing capability and a prediction capability with a tracking filter.

9. The method of claim 1, wherein the correlation sequence is a timing recovery correlation sequence.

10. A system comprising:
a multi-sector antenna; and
a computing device configured to:
   receive a first correlation sequence transmitted by a transmitting node via the multi-sector antenna;
   identify an antenna sector of the multi-sector antenna to be used to communicate with the transmitting node according to a signal-to-noise ratio of the first correlation sequence;
   receive a second correlation sequence transmitted by the transmitting node via an identified antenna sector; and
   refine the directionality of the identified antenna sector of the multi-sector antenna to an antenna sub-sector or phased array beam angle of the identified antenna sector according to a signal-noise-ratio of the second correlation sequence.

* * * * *